United States Patent
Ke et al.

(10) Patent No.: US 10,632,693 B2
(45) Date of Patent: Apr. 28, 2020

(54) FIBER COIL MOUNTING DEVICE USED IN AUTOMATED COMPOSITE MATERIAL LAYUP EQUIPMENT

(71) Applicant: ZHEJIANG UNIVERSITY, Zhejiang (CN)

(72) Inventors: Zhenzheng Ke, Zhejiang (CN); Liang Cheng, Zhejiang (CN); Weidong Zhu, Zhejiang (CN); Weiwei Qu, Zhejiang (CN); Yinglin Ke, Zhejiang (CN); Junxia Jiang, Zhejiang (CN); Jiangxiong Li, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 34 days.

(21) Appl. No.: 16/197,381

(22) Filed: Nov. 21, 2018

(65) Prior Publication Data

US 2020/0031062 A1    Jan. 30, 2020

(30) Foreign Application Priority Data

Jul. 24, 2018    (CN) .......................... 2018 1 0821153

(51) Int. Cl.
*B65H 75/24*    (2006.01)
*B65H 49/36*    (2006.01)
*B29C 70/38*    (2006.01)

(52) U.S. Cl.
CPC ........... *B29C 70/38* (2013.01); *B65H 75/242* (2013.01); *B65H 49/36* (2013.01); *B65H 2701/53* (2013.01)

(58) Field of Classification Search
CPC .... B65H 75/22; B65H 75/242; B65H 75/245; B65H 75/248; B65H 49/36; B65H 54/543; B29C 70/38; B29C 70/382
USPC ...................................................... 242/573.2
See application file for complete search history.

(56) References Cited

U.S. PATENT DOCUMENTS

| | | | | |
|---|---|---|---|---|
| 3,998,400 A | * | 12/1976 | Gee ....................... | B65H 75/245 242/573.3 |
| 4,254,920 A | * | 3/1981 | Peterson ............... | B23B 31/406 242/576.1 |
| 4,375,278 A | * | 3/1983 | Beeck .................. | B65H 54/543 242/571.3 |
| 4,500,046 A | * | 2/1985 | Woenker ............... | B65H 19/30 242/414.1 |

FOREIGN PATENT DOCUMENTS

| | | |
|---|---|---|
| CN | 104626610 | 5/2015 |
| CN | 105690801 | 6/2016 |

* cited by examiner

*Primary Examiner* — William E Dondero
(74) *Attorney, Agent, or Firm* — JCIPRNET

(57) ABSTRACT

A fiber coil mounting device is used in automated composite material layup equipment. The fiber coil mounting device includes a fiber coil mounting shaft with axial hollow structure, a fiber stop plate disposed on two sides of the fiber coil mounting shaft, and an anti-slide fiber coil tightening mechanism. The anti-slide fiber coil tightening mechanism includes a piston assembly disposed inside the axial hollow structure, a spring piece disposed on the piston assembly, a driving unit controlling an axial slide of the piston assembly, and a tightening unit driven by an axial force produced by the spring piece during the axial slide of the piston assembly.

10 Claims, 5 Drawing Sheets

FIBER COIL MOUNTING DEVICE USED IN AUTOMATED COMPOSITE MATERIAL LAYUP EQUIPMENT

CROSS-REFERENCE TO RELATED APPLICATION

This application claims the priority benefit of China application serial no. 201810821153.0, filed on Jul. 24, 2018. The entirety of the above-mentioned patent application is hereby incorporated by reference herein and made a part of this specification.

FIELD OF THE INVENTION

The present invention is related to the technical field of automated placement of composite materials, in particular to a fiber coil mounting device used in automated composite material layup equipment.

BACKGROUND ARTS

In recent years, composite materials have become preferred materials for development of aircraft in various countries in the world owing to such advantages as high specific strength, high rigidity, as well as fatigue resistance and corrosion resistance. Conventional method for forming composite material components are mainly manual layup and filament winding. Manual layup has such disadvantages as low production efficiency, high labor intensity, and high scrap rate. Layup quality relies heavily on operators' experiences and technical skills. Filament winding can only be used to manufacture large components with positive surface curvature. As a result, automated layup of composite materials is a trend in modern aircraft manufacturing field.

Technology of automated layup of composite materials is divided into narrow tape automated layup and tow automated layup. Narrow tape automated layup of composite materials adopts narrow tape with isolating lining paper, which can only be used in layup of components having simple curvature or planar components. Tow automated layup of composite materials adopts multiple tows of prepreg yarn that are individually transferred and cut. A fiber layup head is used to cluster several tows of prepreg yarn into a prepreg band with a variable width, and then hot press the prepreg band on the mould for shaping. Tow automated layup of composite materials can be used for layup of hyperboloid structure having complicated configuration, such as fuselage and S-shaped air inlet, which is widely applicable.

As tows of composite materials are conveyed independently, when a roll of prepreg yarn runs out, it is necessary to replace the tow coil and lining paper coil. Chinese Patent Publication No. CN105690801A disclosed a universal layup device for automated layup of carbon fiber composite; wherein, tow layup unit comprises a support tray. The support tray is installed with a tow thermostat. The tow thermostat is provided with a plurality of sleeve assemblies. The sleeve assemblies rotate around a sleeve spindle fixed on the support tray. Each of the sleeve assemblies comprises a sleeve. The tow is winded on a surface of the sleeve. Layers of the tow are isolated by plastic film. The sleeve is sleeved on the sleeve spindle. Rotation of the sleeve is driven by a driving motor. A film-stripping roll shaft is provided beside each sleeve assembly. The film-stripping roll shaft is used for winding and collection of plastic film among tows.

Chinese Patent Publication No, CN104626610A disclosed a modularized fiber layup head for automated layup of composite materials; wherein, a fiber coil mounting module is used for quick assembly and disassembly of fiber coil for layup. The module includes a magnetic powder brake used to regulate tension of tows, a bearing seat used for mounting of a bearing, a bearing end cap for positioning of a bearing outer ring, an angular contact ball bearing, a grommet used to connect the bearing end cap with the magnetic powder brake, a fiber coil, an intermediate shaft for mounting of the fiber coil, a coupler used to transfer torque produced by the magnetic powder brake to the intermediate shaft, a stop ring used for positioning of fiber coil, and a nut used to fix the fiber coil. Its functions are realized based on the following principles. Use the nut and the stop ring to fix the fiber coil. A friction force produced by the stop ring and an internal shaft of the fiber coil realize security between the fiber coil and the intermediate shaft for rotation. It is known that there are few mounting devices adapted for fiber coil and lining paper coil according to information disclosed so far; it is impossible to effectively solve the problem of sliding between the fiber coil or the lining paper coil and mounting device. Furthermore, most of the mounting devices have such disadvantages as complicated disassembly and low efficiency.

SUMMARY

Aiming at the deficiency of the existing technology, the present invention provides a fiber coil mounting device for used in automated composite material layup equipment, which effectively solves the problem of sliding between the fiber coil or the lining paper coil and mounting device.

Technical solutions provided by the present invention are stated as follows.

A fiber coil mounting device is used in automated composite material layup equipment. The fiber coil mounting device includes a fiber coil mounting shaft having an axial hollow structure, a fiber stop plate disposed on two sides of the fiber coil mounting shaft, and an anti-slide fiber coil tightening mechanism. The anti-slide fiber coil tightening mechanism comprises a piston assembly disposed inside the axial hollow structure, a spring piece disposed on the piston assembly, a driving unit controlling an axial slide of the piston assembly, and a tightening unit driven by an axial force produced by the spring piece during the axial slide of the piston assembly.

The fiber coil mounting device according to the present invention can be used for mounting of a fiber coil or a lining paper coil.

In the present invention, the driving unit controls the axial slide of the piston assembly inside the axial hollow structure. The axial force produced by the spring piece on the tightening unit varies when the piston assembly slides. The tightening unit is at a contracted status when the axial force is relatively low or approximate to zero, which will not produce friction on an internal surface of the fiber coil or the lining paper coil that are disposed on the fiber coil mounting shaft. On the contrary, the tightening unit is at a tightening status when the axial force is higher, which will produce the friction on the internal surface of the fiber coil or the lining paper coil mounted on the fiber coil mounting shaft, and this can prevent the fiber coil or the lining paper coil from sliding.

As an improvement, the spring piece is in tilted arrangement on the piston assembly as a whole, of which merely one end is fixed to the piston assembly. As the spring piece is in tilted arrangement as a whole, varied position of force produced by contact between the spring piece and the tightening unit during sliding of piston assembly may result varied action force produced by the spring piece on the tightening unit.

The tightening unit according to the present invention comprises an elastic O-ring disposed on a wall of the fiber coil mounting shaft and a driving assembly penetrating through the wall of the fiber coil mounting shaft. The driving assembly is displaced via the axial force produced by the spring piece, and drives the O-ring to expand or contract.

The driving assembly according to the present invention comprises an O-ring top block and a connecting block. The O-ring top block abuts against the O-ring and the connecting block. The connecting block abuts against the spring piece and the O-ring top block. As an improvement, a limit groove is provided on a contact surface between the O-ring top block and the connecting block to prevent disengagement of the two under compression; meanwhile, it can make sure to transfer action force produced by the spring piece to the O-ring top block and the O-ring to the maximum extent.

According to the present invention, a groove that is able to receive the O-ring is provided on the driving assembly and the fiber coil mounting shaft. The groove can facilitate concealment of the O-ring at a non-tightening status according to its structural design, which will not affect disassembly of the fiber coil or the lining paper coil from the fiber coil mounting shaft.

The driving unit according to the present invention comprises a handle and a first connecting shaft disposed inside the axial hollow structure. One end of the first connecting shaft is connected to the piston assembly, and another end of the first connecting shaft penetrates through the axial hollow structure for connection with the handle. The handle, a structural design among the first connecting shaft and the piston assembly can facilitate control of piston position via a pull handle.

The first connecting shaft according to the present invention is provided with a stop pin. The stop pin mainly aims to limit the position where the piston assembly is pulled by the handle.

It is applicable to select a quantity of the anti-sliding fiber coil tightening mechanism of the present invention according to actual working conditions. As an improvement, the anti-slide fiber coil tightening mechanism includes two anti-slide fiber coil tightening mechanisms. Adjacent piston assemblies are connected via a second connecting shaft. It is applicable to realize linking and co-movement between the two anti-slide fiber coil tightening mechanisms via the second connecting shaft.

The fiber coil mounting device according to the present invention further comprises a disassembly mechanism for the fiber stop plate. The disassembly mechanism comprises a flange plate fixed on a lateral end of the fiber coil mounting shaft and penetrated by the driving unit, a spring limit block fixed on the flange plate and penetrated by the driving unit, a press block slidably sleeved on the flange plate, and a compression spring abutting against the spring limit block and the press block. The compression spring presses the fiber stop plate on the flange plate by extruding the press block. The fiber stop plate is provided with a through hole for disassembly at a non-compression status. According to the aforesaid structural design, shift of the fiber stop plate to the non-compression status can be achieved only by pulling the press block. It is applicable to make use of the through hole for quick disassembly.

As an improvement, the through hole and an external contour of the flange plate form an engaging structure for limitation of an axial displacement of the fiber stop plate. The engaging structure prevents axial slide or rotation of the fiber stop plate relative to the flange plate when being at a compression status.

As an improvement, the through hole has the same contour shape as that of the press block, and the press block can penetrate through the through hole. According to this setting, it is favorable for quick and convenient disassembly of the fiber stop plate by pulling and rotating the press block in correspondence to the through hole.

As an improvement, the anti-slide fiber coil tightening mechanism comprises two or four groups of spring pieces and tightening units symmetrically arranged on the piston assembly.

As compared with the aforesaid prior arts, the present invention has the following beneficial effect.

(1) The fiber coil mounting device according to the present invention is provided with an anti-slide fiber coil tightening mechanism that controls axial slide of piston assembly inside the axial hollow structure via the driving unit. Different axial force produced by the spring piece on the tightening unit during sliding of the piston assembly can realize control of tightening status of the tightening unit, which can also produce friction on the internal surface of the fiber coil or the lining paper coil installed on the fiber coil mounting shaft; this can prevent the fiber coil or the lining paper coil from sliding.

(2) The fiber coil mounting device according to the present invention is also provided with a mechanism for disassembly of the fiber stop plate. It is applicable to shift the fiber stop plate to the non-compression status by pulling the press block; it is also applicable to remove the fiber stop plate via the through hole to realize quick disassembly.

(3) According to the present invention, coordination between the anti-slide fiber coil tightening mechanism and the disassembly mechanism has effectively shortened the assembly time of the fiber coil or the lining paper coil, thereby improving the efficiency.

DETAILED DESCRIPTION OF THE PREFERRED EMBODIMENTS

The present invention is further described as follows in combination with preferred embodiments.

Figure 1:
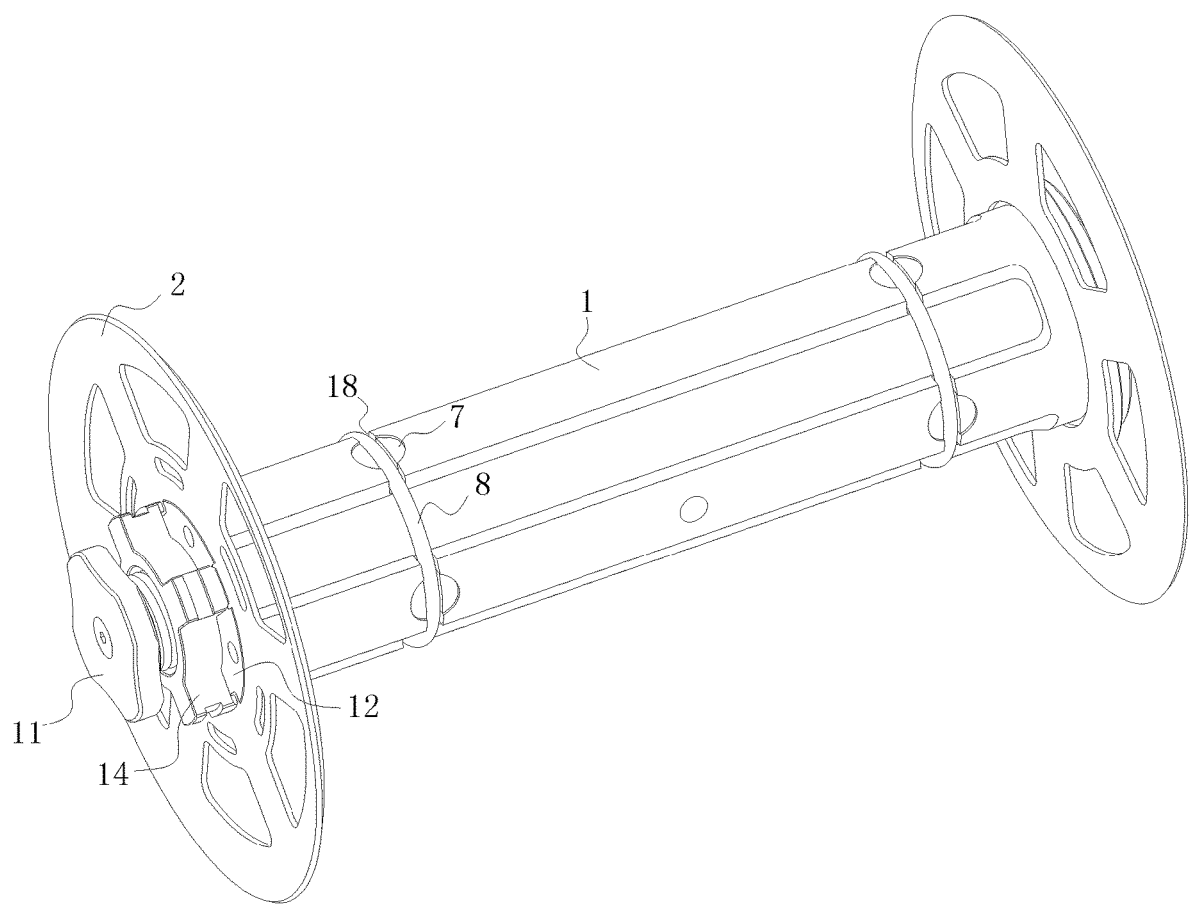
FIG. 1 is a perspective view showing fiber coil mounting device.
Figure 2:
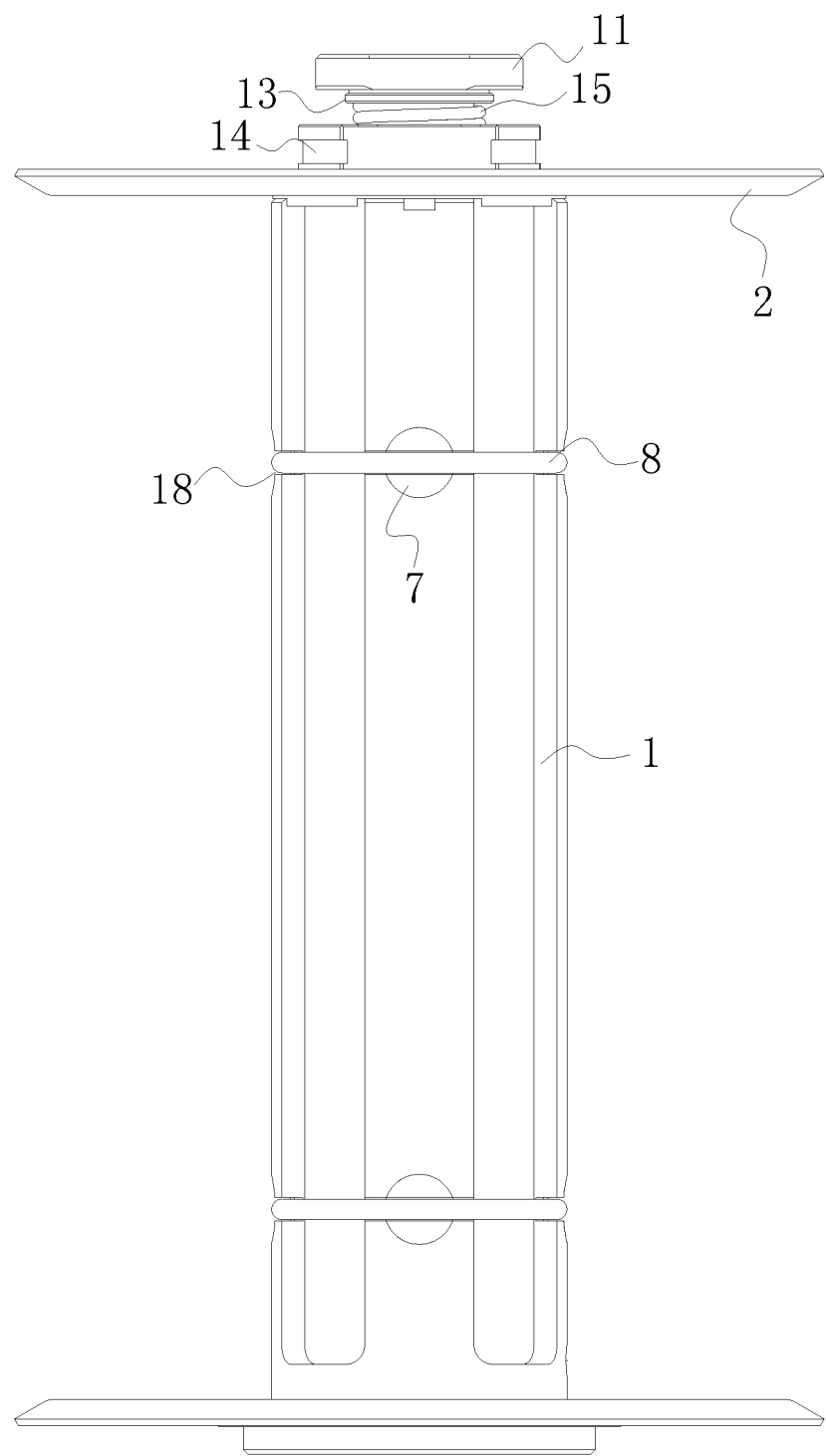
FIG. 2 is a front view of the fiber coil mounting device.

Normally, a fiber coil mounting device as shown in FIG. 1 and FIG. 2 can be installed on a fiber layup head of automated composite material layup equipment. The fiber coil mounting device is used to mount a fiber coil or a lining paper coil.

The fiber coil mounting device comprises a fiber coil mounting shaft 1 having an axial hollow structure 4, a fiber stop plate 2 disposed on two sides of the fiber coil mounting shaft 1, an anti-slide fiber coil tightening mechanism, and a disassembly mechanism for the fiber stop plate 2. The fiber stop plate 2 disposed on one side of the fiber coil mounting shaft 1 is installed in a removable way; furthermore, corresponding disassembly mechanism is also installed on this side, and the fiber stop plate 2 disposed on the other side can be fixedly mounted to the fiber coil mounting shaft 1.

Figure 4:
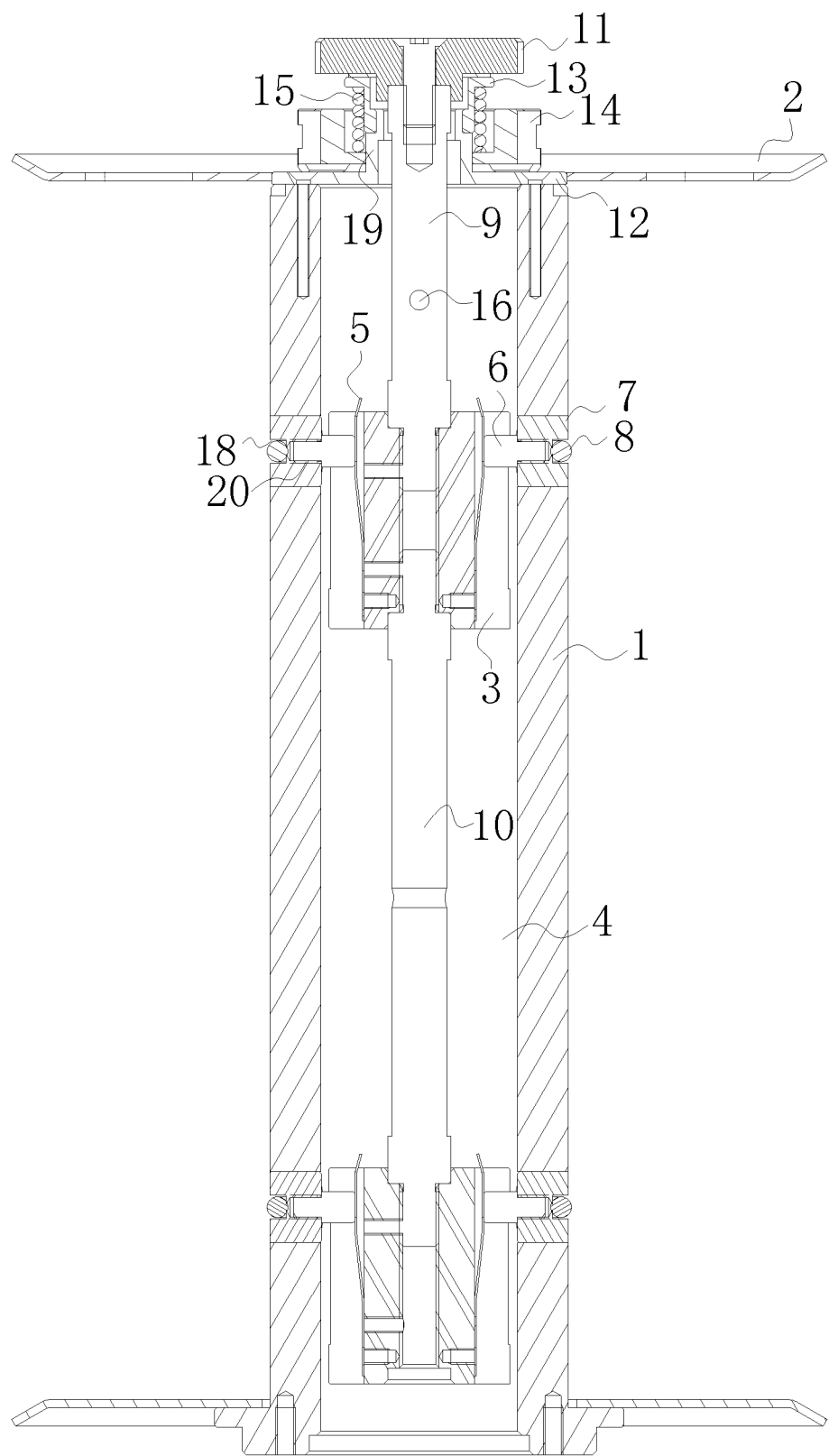
FIG. 4 is a sectional view of the fiber coil mounting device at a tightening status.
Figure 5:
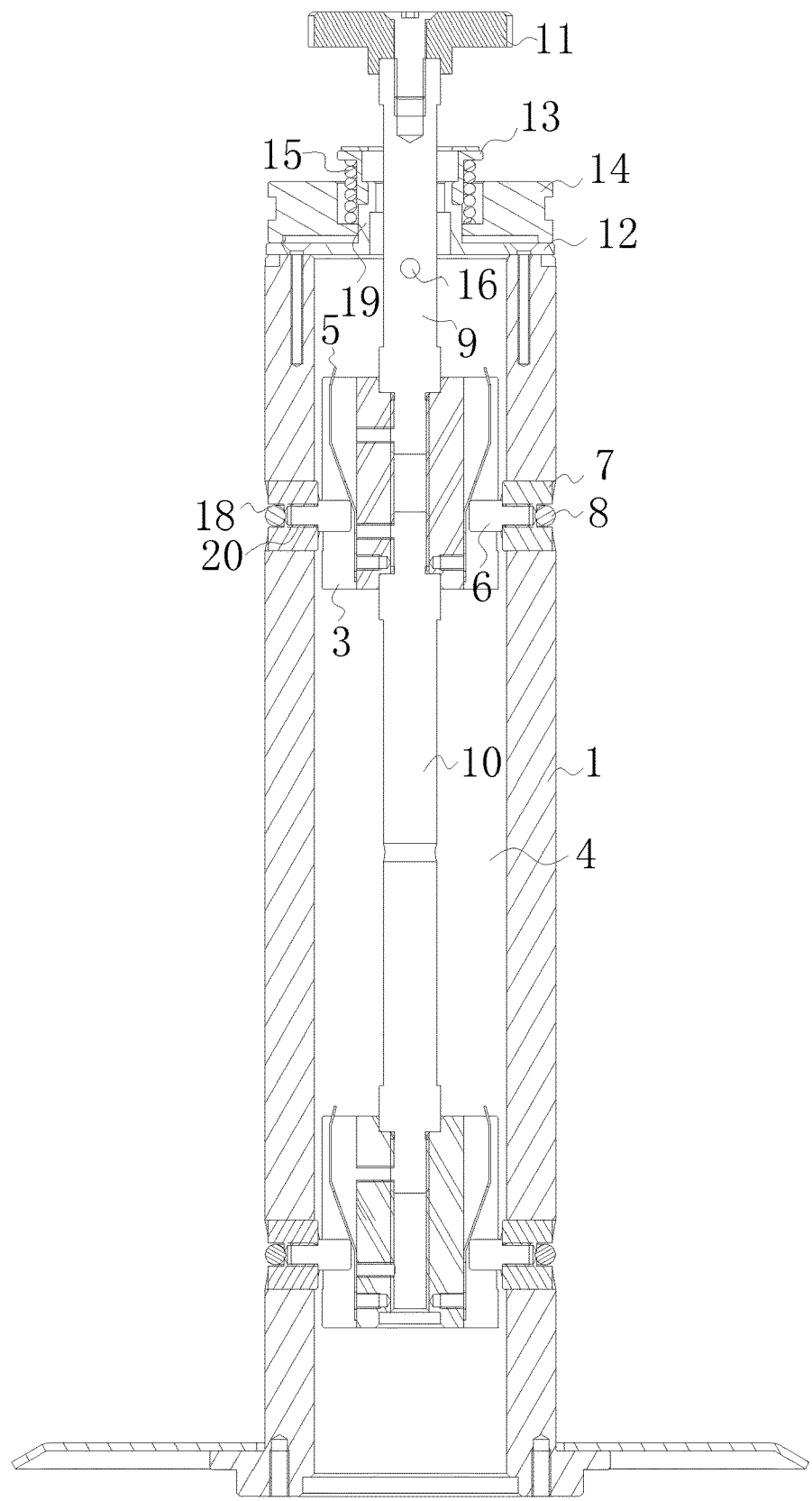
FIG. 5 is a sectional view of the fiber coil mounting position at a non-tightening status.

As shown in FIG. 4 and FIG. 5, the fiber coil mounting shaft 1 in this embodiment comprises two groups of the anti-slide fiber coil tightening mechanisms. It is also applicable to increase or decrease the quantity of the anti-slide fiber coil tightening mechanisms according to actual working conditions.

As the two groups of the anti-slide fiber coil tightening mechanisms have same structure, only one group of the anti-slide fiber coil tightening mechanism is to be introduced in this embodiment. The anti-slide fiber coil tightening mechanism comprises a piston assembly 3, a spring piece 5, an O-ring 8, an O-ring top block 7, and a connecting block 6. The piston assembly 3 is slidably provided inside the axial hollow structure 4 of the fiber coil mounting shaft 1. Four groups of the spring pieces 5, the O-ring top block 7, and the connecting block 6 are symmetrically arranged on a circular side wall of the piston assembly 3. Adjacent piston assemblies 3 are fixed via a second connecting shaft 10. The piston assembly 3 located on a side of the removable fiber stop plate 2 is fixed to a first connecting shaft 9. The first connecting shaft 9 penetrates through the axial hollow structure 4 for connection with a handle 11. The handle 11, the first connecting shaft 9, and the second connecting shaft 10 are located on a core of the fiber coil mounting shaft 1.

One end of the spring piece 5 is fixed to the circular side wall of the piston assembly 3. The spring piece 5 is in titled arrangement as a whole relative to the circular side wall of the piston assembly 3. As the spring piece 5 is in tilted arrangement as a whole, varied position of force produced by contact between the spring piece 5 and the connecting block 6 during sliding of the piston assembly 3 may result in varied action force produced by the spring piece 5 on the O-ring 8. The O-ring top block 7 penetrates through the circular side wall of the fiber coil mounting shaft 1 and is correspondingly disposed on an upper part of the spring piece 5. The connecting block 6 is installed between the spring piece 5 and the O-ring top block 7 to make the O-ring top block 7 abut against between the O-ring 8 and the connecting block 6. The connecting block 6 abuts against between the spring piece 5 and the O-ring top block 7. A limit groove 20 is provided on a contact surface between the O-ring top block 7 and the connecting block 6 to prevent disengagement of the two under compression; meanwhile, it can make sure to transfer action force produced by the spring piece 5 to the O-ring top block 7 and the O-ring 8 to the maximum extent.

The elastic O-ring 8 is arranged on the circular side wall of the fiber coil mounting shaft 1. A groove 18 that can receive the O-ring 8 is provided on the circular side wall of the O-ring top block 7 and the fiber coil mounting shaft 1.

Figure 3:
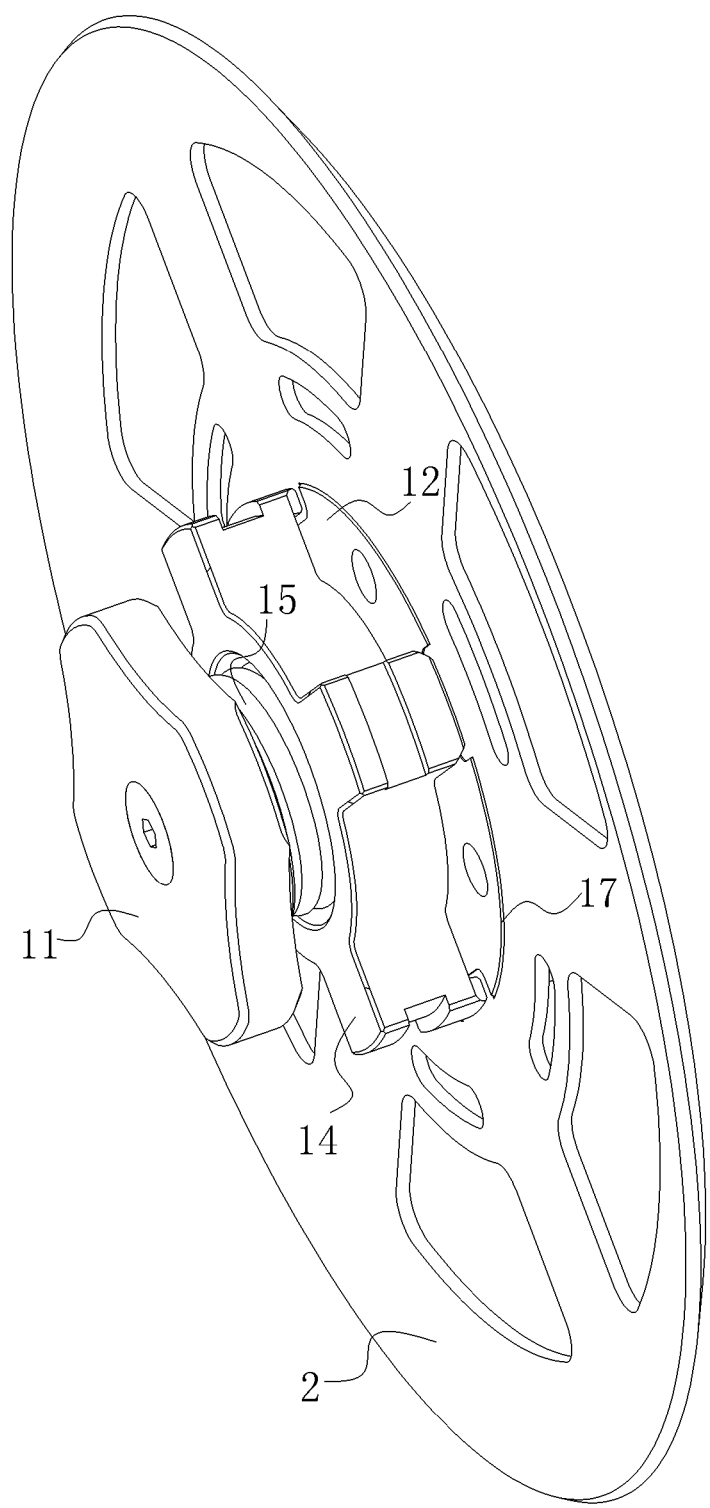
FIG. 3 is a fragmentary enlarged view of fiber coil mounting device.

As shown in FIG. 3, the disassembly mechanism on the side of the removable fiber stop plate 2 comprises a flange plate 12, a spring limit block 13, a press block 14, and a compression spring 15. The flange plate 12 is fixed to the lateral end of the fiber coil mounting shaft 1. A through hole 17 is provided at a center of the fiber stop plate 2. The fiber stop plate 2 engages and is mounted on the flange plate 12 via the through hole 17 to restrict axial displacement or rotation of the fiber stop plate 2.

The spring limit block 13 is fixed to an axial projection 19 of the flange plate 12 via a threaded structure, wherein the spring limit block 13 and the axial projection 19 are concentrically installed on the core of the fiber coil mounting shaft 1. The flange plate 12 and the spring limit block 13 are penetrated by the first connecting shaft 9. The handle 11 is installed on a projecting portion of the first connecting shaft 9, and is located on an external side of the spring limit block 13. Furthermore, a part of the first connecting shaft 9 inside the axial hollow structure 4 is further provided with a stop pin 16. It is also applicable to control a sliding distance of the piston assembly 3 via the stop pin 16 and the spring limit block 13.

The press block 14 is slidably sleeved on the axial projection 19 of the flange plate 12. The compression spring 15 abuts against the spring limit block 13 and the press block 14. The compression spring 15 abuts against the press block 14 to further press the fiber stop plate 2 on the flange plate 12.

The through hole 17 has the same contour shape as that of the press block 14, and the press block 14 can penetrate through the through hole 17. According to this setting, it is favorable for quick and convenient disassembly of the fiber stop plate by pulling and rotating the press block 14 in correspondence to the through hole 17.

Working process is stated as follows.

As shown in FIG. 4, the connecting block 6 is located at a position with a maximum force exerted on the spring piece 5. The connecting block 6 transfers the action force produced by the spring piece 5 to the O-ring 8 via the O-ring top block 7. In this case, the O-ring 8 inside the fiber coil mounting device is to be at a tightening status. A friction between an inner surface of the fiber coil or the lining paper coil and the fiber coil mounting shaft 1 can prevent the fiber coil or the lining paper coil from sliding.

When it is necessary to replace the fiber coil or the lining paper coil, first, the press block 14 is pulled and rotated in alignment with the through hole 17 on the fiber stop plate 2, such that the fiber stop plate 2 can be removed.

Next, as shown in FIG. 5, handle 11 is pulled to drive the first connecting shaft 9 and the two groups of the anti-slide fiber coil tightening mechanisms to shift. At this time, the connecting block 6 is not to be affected by the action of the spring piece 5, and the O-ring 8 is at a contracted status. In this way, it is applicable to remove old fiber coil or lining paper coil for replacement.

Afterwards, the handle 11 is pushed back to the status as shown in FIG. 4, which drives friction between the inner surface of new fiber coil or lining paper coil and the fiber coil mounting shaft 1, thereby preventing sliding.

Then, the through hole 17 on fiber stop plate 2 engages and is mounted to the flange plate 12, and the press block 14 is pulled. Afterwards, the press block 14 is rotated for misplacement with the through hole 17 on the fiber stop plate 2, and finally the compression spring 15 is pressed against (abuts against) the press block 14 to further press the fiber stop plate 2 on the flange plate 12.

What is claimed is:

1. A fiber coil mounting device used in automated composite material layup equipment, the fiber coil mounting comprising: a fiber coil mounting shaft having an axial hollow structure, a fiber stop plate disposed on two sides of the fiber coil mounting shaft, and an anti-slide fiber coil tightening mechanism, wherein, the anti-slide fiber coil tightening mechanism comprises a piston assembly disposed inside the axial hollow structure, a spring piece disposed on the piston assembly, a driving unit controlling an axial slide of the piston assembly, and a tightening unit driven by an axial force produced by the spring piece during the axial slide of the piston assembly.

2. The fiber coil mounting device used in automated composite material layup equipment according to claim 1, wherein the tightening unit comprises an elastic O-ring disposed on a wall of the fiber coil mounting shaft and a driving assembly penetrating through the wall of the fiber coil mounting shaft; the driving assembly is displaced via the axial force produced by the spring piece, and drives the O-ring to expand and contract.

3. The fiber coil mounting device used in automated composite material layup equipment according to claim 2, wherein the driving assembly comprises an O-ring top block and a connecting block; the O-ring top block abuts against the O-ring and the connecting block; the connecting block abuts against the spring piece and the O-ring top block.

4. The fiber coil mounting device used in automated composite material layup equipment according to claim 2, wherein a groove that is able to receive the O-ring is provided on the driving assembly and the surface of the fiber coil mounting shaft.

5. The fiber coil mounting device used in automated composite material layup equipment according to claim 1, wherein the driving unit comprises a handle and a first connecting shaft disposed inside the axial hollow structure; one end of the first connecting shaft is connected to the piston assembly, and another end of the first connecting shaft penetrates through the axial hollow structure for connection with the handle.

6. The fiber coil mounting device used in automated composite material layup equipment according to claim 5, wherein the first connecting shaft is provided with a positioning pin.

7. The fiber coil mounting device used in automated composite material layup equipment according to claim 1, wherein the anti-slide fiber coil tightening mechanism includes two anti-slide fiber coil tightening mechanisms, and adjacent piston assemblies are connected via a second connecting shaft.

8. The fiber coil mounting device used in automated composite material layup equipment according to claim 1, further comprising a disassembly mechanism for the fiber stop plate; wherein the disassembly mechanism comprises a flange plate fixed on a lateral end of the fiber coil mounting shaft and penetrated by the driving unit, a spring limit block fixed on the flange plate and penetrated by the driving unit, a press block slidably sleeved on the flange plate, and a compression spring abutting against the spring limit block and the press block; the compression spring presses the fiber stop plate on the flange plate by extruding the press block; the fiber stop plate is provided with a through hole for disassembly at a non-compression status.

9. The fiber coil mounting device used in automated composite material layup equipment according to claim 8, wherein the through hole and an external contour of the flange plate form an engaging structure for limitation of an axial displacement of the fiber stop plate.

10. The fiber coil mounting device used in automated composite material layup equipment according to claim 1, wherein the anti-slide fiber coil tightening mechanism comprises two or four groups of spring pieces and tightening units symmetrically arranged on the piston assembly.

* * * * *